(12) United States Patent
Gulati et al.

(10) Patent No.: US 7,921,328 B1
(45) Date of Patent: Apr. 5, 2011

(54) CHECKPOINT CONSOLIDATION FOR MULTIPLE DATA STREAMS

(75) Inventors: Shvetima Gulati, San Jose, CA (US);
Hitesh Sharma, Santa Clara, CA (US);
Atul R. Pandit, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 323 days.

(21) Appl. No.: 12/106,166

(22) Filed: Apr. 18, 2008

(51) Int. Cl.
*G06F 11/00* (2006.01)
(52) U.S. Cl. .................................. 714/6; 714/15; 714/20
(58) Field of Classification Search .................. None
See application file for complete search history.

(56) References Cited

U.S. PATENT DOCUMENTS

| | | | | |
|---|---|---|---|---|
| 5,737,514 A | * | 4/1998 | Stiffler | 714/13 |
| 6,892,244 B2 | * | 5/2005 | De Roose | 709/234 |
| 7,467,259 B2 | * | 12/2008 | Lam | 711/114 |
| 2004/0268177 A1 | * | 12/2004 | Ji et al. | 714/6 |
| 2005/0188254 A1 | * | 8/2005 | Urabe et al. | 714/6 |
| 2008/0082770 A1 | * | 4/2008 | Ahal et al. | 711/162 |
| 2008/0114954 A1 | * | 5/2008 | Burr et al. | 711/162 |
| 2008/0120470 A1 | * | 5/2008 | Dhamankar et al. | 711/135 |
| 2008/0209145 A1 | * | 8/2008 | Ranganathan et al. | 711/162 |
| 2009/0216978 A1 | * | 8/2009 | Fujibayashi | 711/162 |

* cited by examiner

*Primary Examiner* — Michael C Maskulinski
(74) *Attorney, Agent, or Firm* — Blakely, Sokoloff, Taylor & Zafman LLP

(57) ABSTRACT

A mirror destination storage server receives mirror update data streams from several mirror source storage servers. Data received from each mirror is cached and periodic checkpoints are queued, but the data is not committed to long-term storage at the mirror destination storage server immediately. Instead, the data remains in cache memory until a trigger event causes the cache to be flushed to a mass storage device. The trigger event is asynchronous with respect to packets of at least one of the data streams. In one embodiment, the trigger event is asynchronous with respect to packets of all of the data streams.

24 Claims, 9 Drawing Sheets

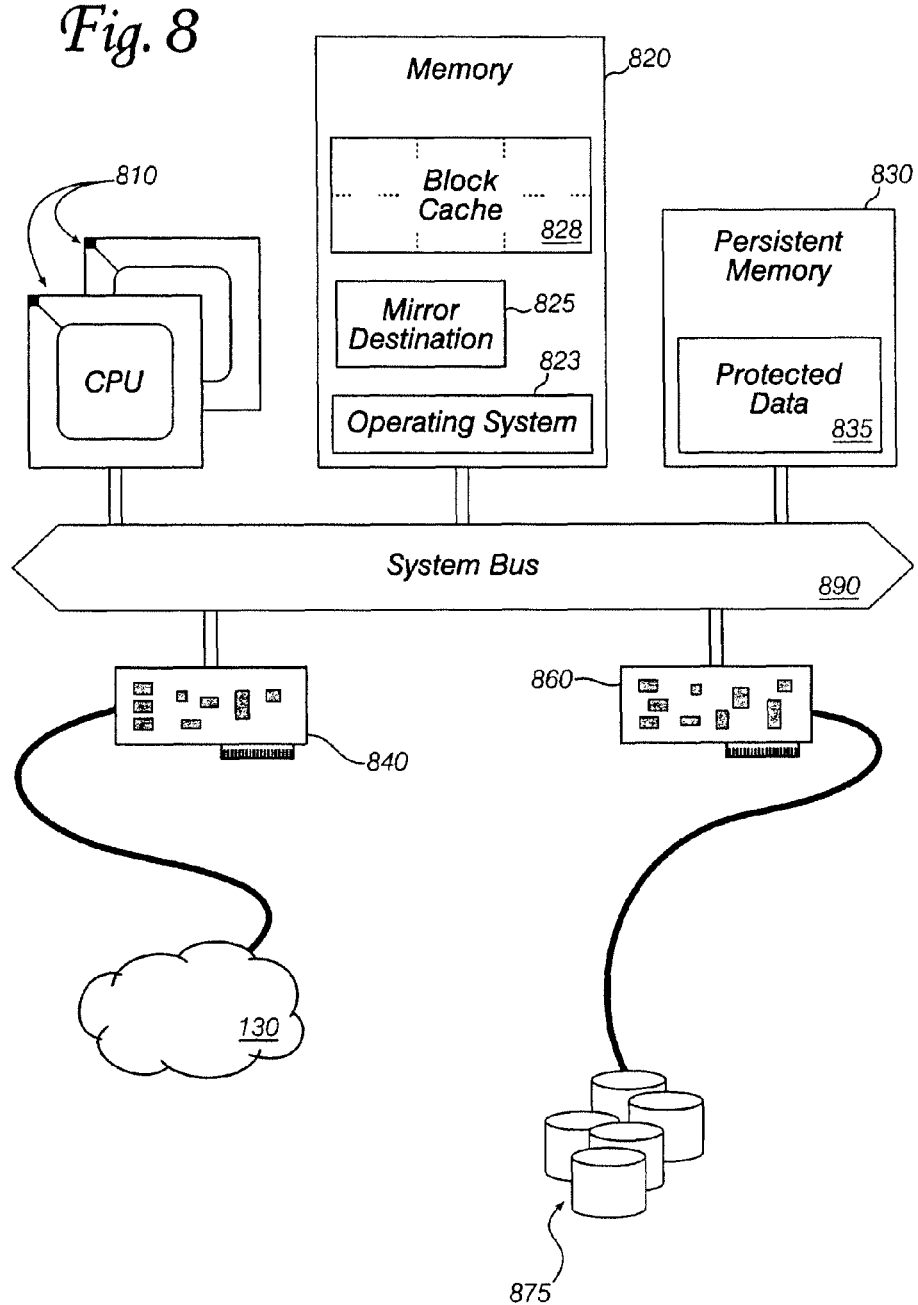

CHECKPOINT CONSOLIDATION FOR MULTIPLE DATA STREAMS

FIELD

The invention relates to storage server operations. More specifically, the invention relates to optimizing caching and data storage at a storage server that maintains mirrors of storage volumes at other servers.

BACKGROUND

Contemporary data processing systems often produce or operate on large amounts of data—commonly on the order of gigabytes or terabytes in enterprise systems. Since the data may be critical to the operation of a business or other enterprise, many techniques have been developed to prevent data loss or impaired access. One basic approach is to copy all of the data to a secondary storage medium such as magnetic tape or disks or optical disks. This backup strategy has many drawbacks: copying large amounts of data is time-consuming, and applications using the data may have to be disabled during the backup to avoid introducing data inconsistencies that would render the backup useless. Full backups may take hours or days to complete, and a similar amount of time to restore. Also, backups only preserve data stored at the point in time the backup is made. Changes introduced afterward are unprotected and may be lost until the next backup completes successfully.

Incremental backup strategies, which skip data that has not changed since a previous incremental or full backup, can reduce the amount of time and storage required for a backup, at a cost of increased complexity and recovery time. Nevertheless, even incremental backups cannot provide protection for new data and data modifications that appear between backups. To reduce the amount of data "at risk," system designers are turning to data mirroring schemes. In a mirror, a complete copy of the data on a source volume is maintained on a destination volume. The destination storage is managed by an independent system, often located in a completely different physical data center. Mirror operations may be arranged so that the mirror is only a few minutes or even just a few seconds out-of-date, so only data created or changed during that short time span may be lost due to a catastrophic failure. Some mirrors operate synchronously: they are always up to date.

A naïve approach to mirroring would call for a duplicate mirror server to back up each main server, doubling the hardware cost of any system. Fortunately, the demands placed on a typical mirror destination server are much less severe than the demands on a mirror source server, so it is often possible for one mirror destination server to maintain backup copies of many mirror source volumes. Source-to-destination ratios of 3:1 or 4:1 are usually possible, and in some environments with adequate network bandwidth and mass storage space, a mirror destination server may be able to maintain mirrors of dozens of source volumes.

As the source-to-destination ratio increases, certain administrative tasks at the mirror destination server may begin to tax the server's resources, limiting the number of additional source servers that can be backed up. Methods of reducing the impact of these administrative tasks can increase the sustainable source-to-destination ratio, thus lowering the number of backup servers required to protect a group of primary servers, and consequently reducing the overall system cost.

SUMMARY

A mirror destination storage server maintains identical copies of data volumes stored at two or more mirror source storage servers based on mirror update transactions received from the mirror source storage servers. During a mirror update transaction, modified data blocks are received and cached at the mirror destination. Various processes at the mirror destination cause the cache to be flushed, and any modified data blocks in the cache at the time will be written to an appropriate mass storage device. The mirror destination tracks the progress of each update transaction using checkpoints so that a failed transaction need not be restarted from the beginning.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 8 shows some components and subsystems of a storage server that implements an embodiment of the invention.

DETAILED DESCRIPTION

Embodiments of the invention streamline mirror destination storage server operations so that each mirror destination storage server can back up more mirror source storage servers. This means that smaller, less capable and less expensive hardware can be used to protect a given set of source storage servers, or that an existing mirror destination storage server can be upgraded with software implementing an embodiment of the invention to obtain increased capacity without new capital expenditure.

Figure 1:
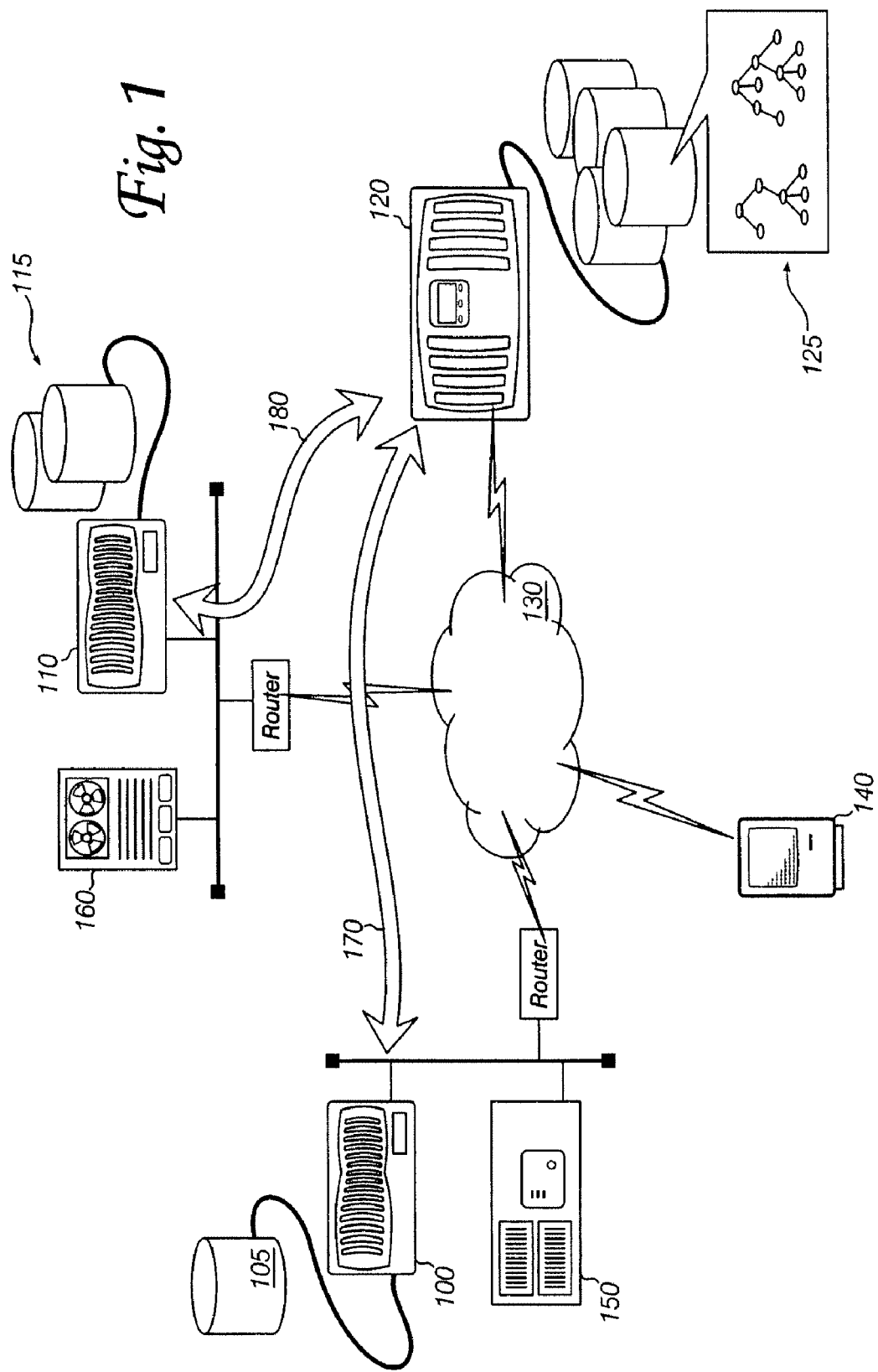
FIG. 1 outlines an environment including two storage servers that maintain data volumes which are mirrored at a third storage server.

FIG. 1 shows an environment including two storage servers, 100 and 110, which communicate with a mirror destination server 120 via a distributed data network 130. Network 130 may be a private network such as a corporate local area network ("LAN"), a public network such as the Internet, a virtual private network ("VPN") operated over a public network, or an extended network including segments or "hops" over networks of various types. Servers 100 and 110 provide data storage services for computers such as desktop computer 140, web server 150 and database server 160. Those of skill in the art will understand that data stored at a storage server such as 100 or 110 may be used at many points in a computer or network transaction. For example, desktop computer 140 may retrieve a web page from web server 150, and the web page data may come from storage server 100. Web server 150 may also authenticate a user at desktop computer 140 by checking the user's credentials against information in a database managed by database server 160 and stored on mass storage devices attached to server 110.

Mirror destination storage server 120 maintains backup copies 125 of data volumes whose "live" or active versions 105, 115 reside at storage server 100 or 110. Data streams carrying information to permit mirror destination server 120 to perform this service are shown as 170 and 180. The data streams place mirror source logic (not shown) at servers 100 and 110 in communication with mirror destination logic (also not shown) at server 120. The interactions between the source and destination logic modules are examined in greater detail below.

Figure 2:
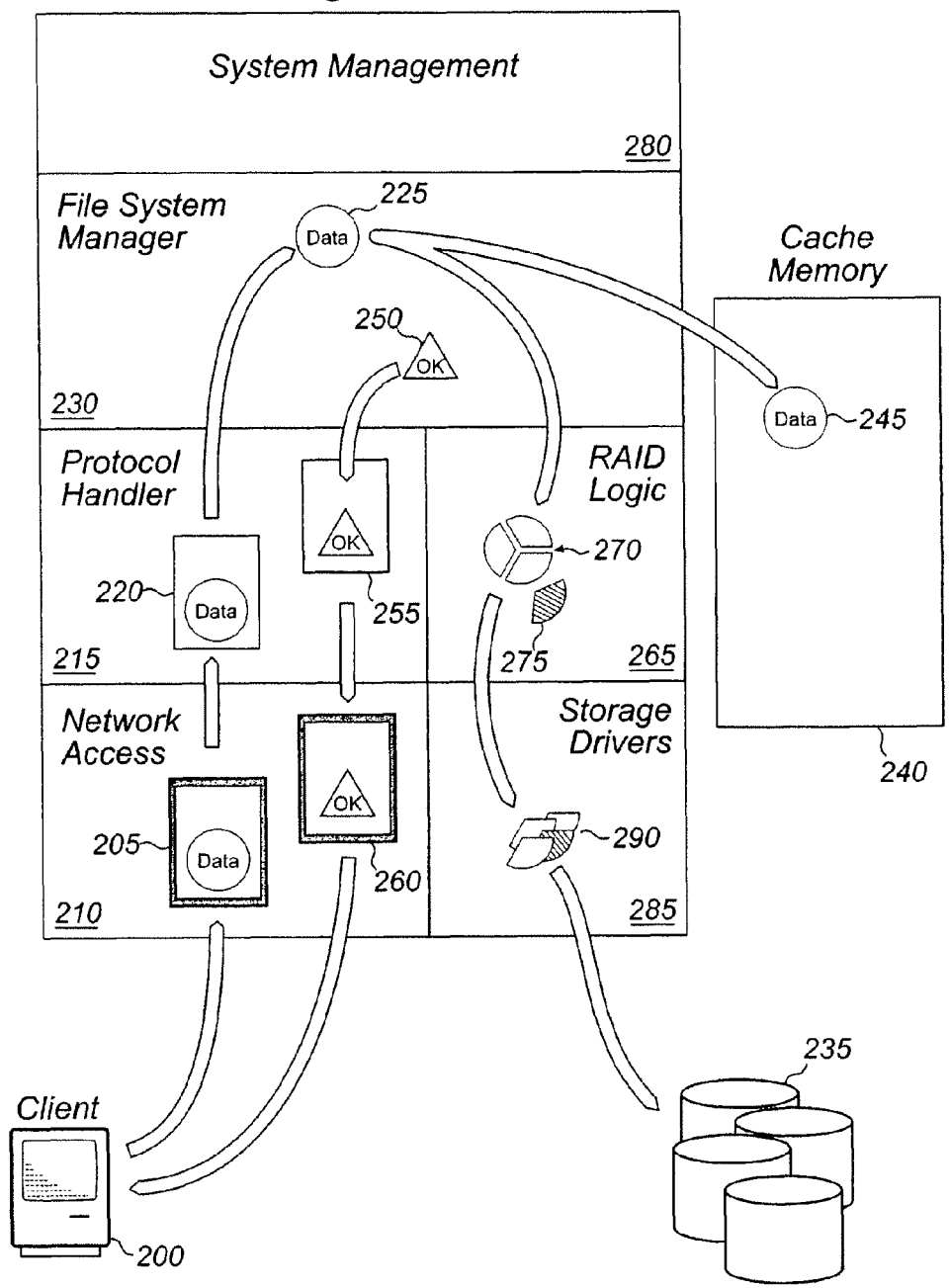
FIG. 2 illustrates interactions between functional components of a storage server.

FIG. 2 shows an example of functional blocks and operational flows in a storage server processing a request from a client 200 to save data. The client's request 205 is received by a network access module 210, and is passed up to a protocol handling module 215 after any network-specific information (e.g., source and destination addresses) is processed. The request 220 is examined by the protocol handler 215 to verify data integrity, client access permissions, and so on; then the data 225 is passed up to a file system manager 230 for further processing.

File system manager 230 maintains data structures and other information (e.g., a "file system") that permit it to present the storage space available at the storage server in a convenient form for clients' use. The Write Anywhere File Layout ("WAFL®") file system manager by NetApp, Inc. of Sunnyvale, Calif., is a file system manager in one embodiment of the invention.

Typically, a storage server appears to a client as an indexed array of uniformly-sized data blocks, or as a hierarchical tree of directories ("folders") containing other directories and files ("documents"). (Some storage servers present an object-oriented view, where arbitrarily-sized stored data may be identified and accessed via a unique key.) The file system manager 230 performs a translation service, so that (for example) a client's request to write to a certain range of bytes in a file can be converted to a range of data blocks in the storage volume where the data is to be stored.

The underlying data storage is often provided by electromechanical devices such as hard disk drives 235, and solid state devices such as flash memory; but such devices may operate relatively slowly (or may be heavily utilized) so that forcing client 200 to wait for the data to be stored on the disks 235 would cause unacceptably long delays. Therefore, most storage servers perform some sort of buffering or caching so that a response (acknowledgement) can be sent to the client more quickly. A sophisticated storage server will implement measures to protect client data that has been acknowledged but not yet committed to a long-term mass storage device. In the example system described here, file system manager 230 stores a copy of client data 225 in a cache memory 240 (client data copy shown as element 245 in FIG. 2), and can immediately return a response 250 to the protocol handler 215, which packages the response 255 and passes it to network access layer 210. The response is further encapsulated 260 for transmission over a network, and is eventually received by client 200.

While the response 250 is being prepared and transmitted, file system manager 230 also begins the more time-consuming task of arranging for the client data to be stored on disks 235. For example, the data may be passed to RAID logic 265, where it is prepared for storage on one or more of a group of independent disks operated as a redundant array (a "RAID group," where "RAID" stands for "Redundant Array of Independent Disks"). The data may be split into pieces 270, and a parity or checksum piece 275 computed, in preparation for writing on the disks of an array. The prepared pieces 270, 275 are forwarded to storage drivers 285, and each piece 290 is stored on an appropriate one of the disks 235. Once the data is committed to disks, the user data 245 in cache memory 240 can be discarded, although it may be retained in cache as long as possible to improve performance.

The operational outline of FIG. 2 glosses over some considerations that take on critical importance when a storage server processes a large number of write requests (often from a similarly large number of clients). That is, any particular write operation proceeds more-or-less along the lines described above, but overall storage server processing must carefully coordinate caching, flushing, reading and writing operations to ensure good aggregate performance. For example, storing data temporarily (that is to be written to disk) in cache memory 240 speeds up client response times, but also consumes a limited resource (the cache memory itself) and increases the amount of data that must eventually be written when the cache is flushed. The system management logic, 280, of a good storage server will balance resource utilization, disk and network bandwidth consumption, and client responsiveness to achieve superior all-around performance. For example, modified ("dirty") data blocks may be allowed to linger in cache memory for up to a predetermined maximum period (e.g., 30 seconds) or until the cache memory reaches a predetermined utilization (e.g., 75% filled). When one of these thresholds or triggers is reached, a cache flush writes all dirty blocks to disk; this event is commonly called a "consistency point".

Figure 3:
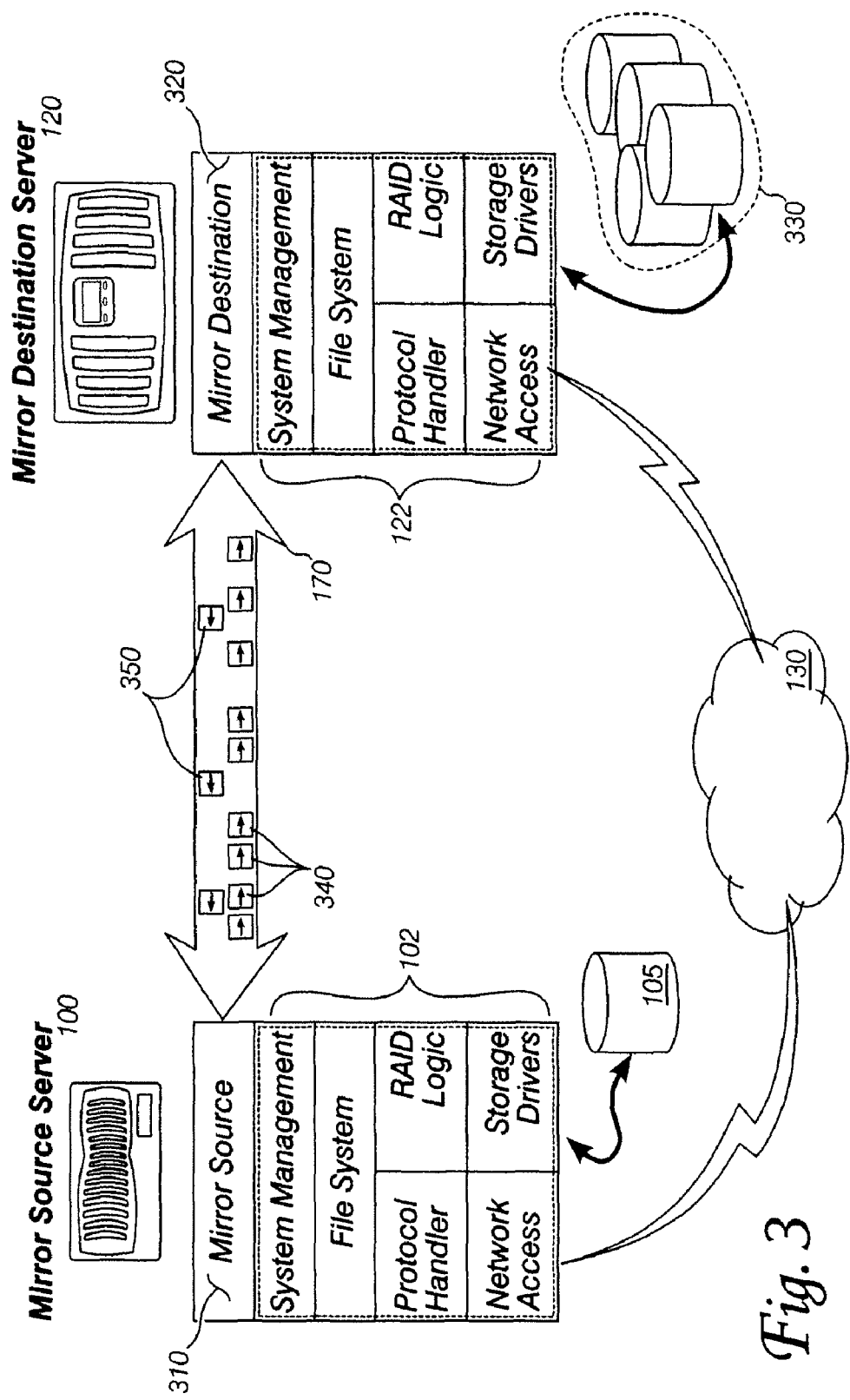
FIG. 3 shows further details of interactions between a mirror source storage server and a mirror destination storage server.

Turning now to FIG. 3, the relationship between two storage servers, one maintaining a mirror image of a volume stored at the other, is described. Mirror source storage server 100 and mirror destination storage server 120 may each have a core software "stack" 102, 122, which functions along the lines described in reference to FIG. 2. In addition, mirror source storage server 100 contains mirror source logic 310, and mirror destination storage server 120 contains mirror destination logic 320. These logic modules communicate via, for example, distributed data network 130. Data traffic between the modules is represented by double-ended arrow 170. It is often the case, as shown in this Figure, that a large number of packets 340 are sent from the mirror source storage server 100 to the mirror destination storage server 120, while a smaller number of packets 350 travel in the opposite direction, carrying control and status information. In some embodiments, packets flowing over logical connection 170 are protected by encryption or similar security measures to prevent an attacker from injecting bogus data packets to be stored in the mirrored volume.

It is appreciated that each server may contain both mirror source logic and mirror destination logic modules, so that each server can function as either a mirror source or a mirror destination. This permits two servers to act as backup mirror servers for each other.

Figure 4:
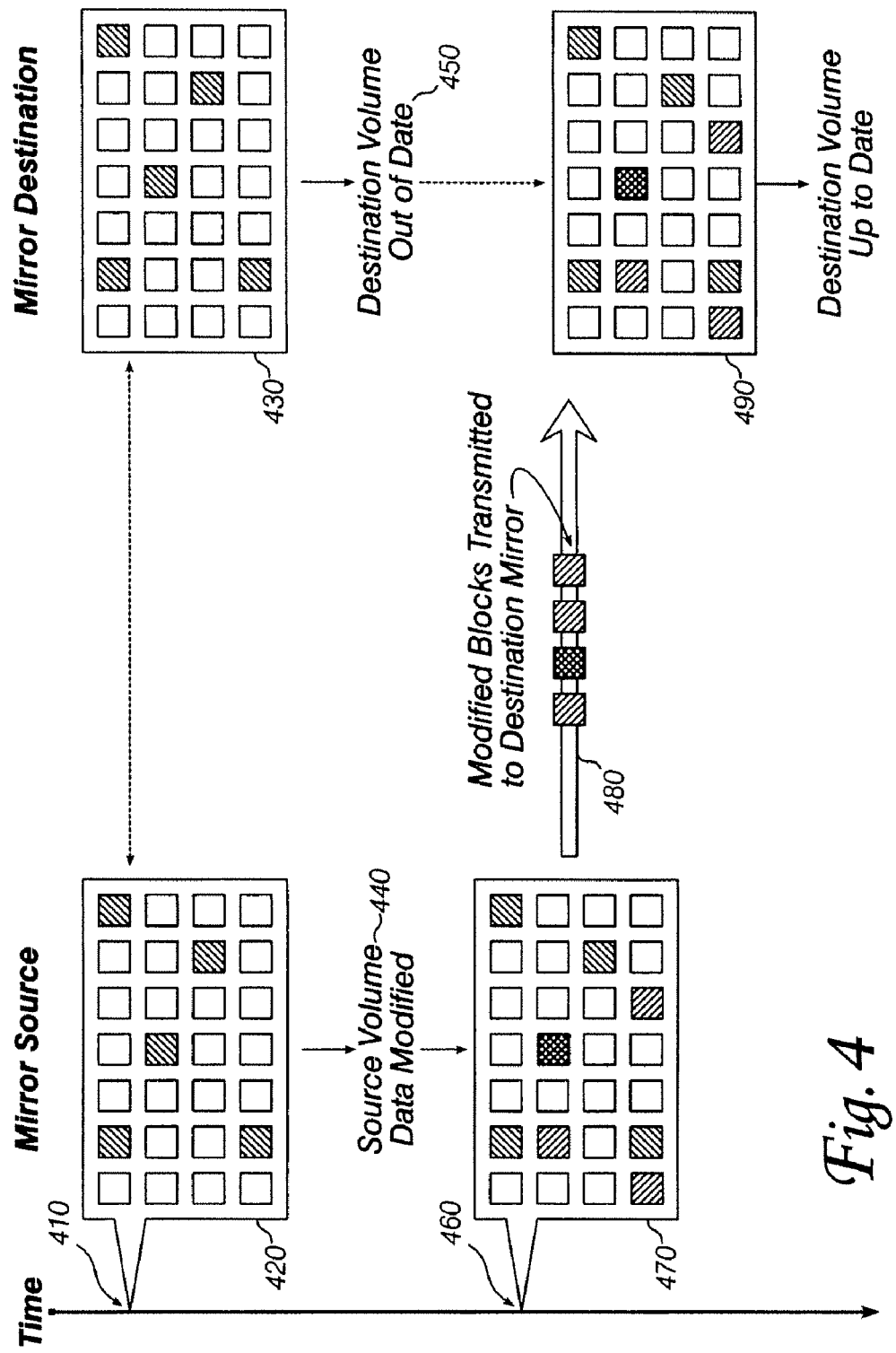
FIG. 4 shows how a mirror source storage volume and mirror destination storage volume fall out of synchronization, and how synchronization can be restored.

FIG. 4 shows how a mirror source storage volume changes over time, and how the corresponding mirror destination storage volume is brought back up to date. At a first time 410, mirror source storage volume 420 and mirror destination storage volume 430 are identical. However, as time progresses, source volume data is modified (440). For example, clients of the mirror source storage server may create new files and modify or delete existing files. Each modification causes the mirror destination volume to become further out of date (450). Consequently, at a later time 460, the state of the mirror source storage volume 470 may be quite different from the state of the mirror destination storage volume 430. To update the destination, the mirror source storage server identifies blocks of the mirror source volume that have changed since time 410 and transmits those blocks to the mirror destination server (480). The mirror destination server saves the modified blocks to its copy of the mirrored volume, and at the end of the process, the mirror destination storage volume 490 is once again identical to the mirror source storage volume 470.

Mirror updates may be performed as often or as infrequently as desired. Generally speaking, the longer the delay between update cycles, the greater the number of modified blocks that must be transferred. For a large, active volume, many blocks may be transmitted during an update cycle. If the update is interrupted by system, network or other difficulties, it is preferable to restart the update at or near the point of interruption, rather than at the beginning. (It is appreciated that a mirror update is idempotent: there is no logical impediment to restarting a failed update at the beginning, but retransmitting and rewriting update blocks that have already been saved at the mirror destination wastes time and system resources.)

To avoid unnecessarily repeating work, the mirror destination storage server may track successfully received and saved update blocks, or may track the update progress at a more granular level. For example, the mirrored storage volume may be regarded as a series of sub-volumes or "slices," and the destination server may note or record a checkpoint as the modified data blocks of slice are received and committed to disk. In some embodiments, the slices may be based on a stripe of a RAID volume (i.e., a checkpoint is recorded after all the updated blocks of a RAID stripe are transmitted from the mirror source to the mirror destination and recorded in the mirror destination volume).

It is important that the checkpoint be recorded no sooner than the corresponding modified data blocks are committed to disk. When write-caching procedures are in effect, there may be a delay between the time a data block is delivered to the writing system, and the time the data block is safely recorded on disk (e.g., after a cache flush). A mirror update procedure must not declare a checkpoint 10 reached until the updated data blocks from the slice are received and delivered to the disk writing subsystem, and a cache flush has succeeded in storing the updated data blocks to disk. If the checkpoint-progress status of a mirror update transaction is also stored on the mass storage subsystem, then recording the checkpoint itself may require a second cache flush to ensure that the checkpoint is safely noted.

Figure 5:
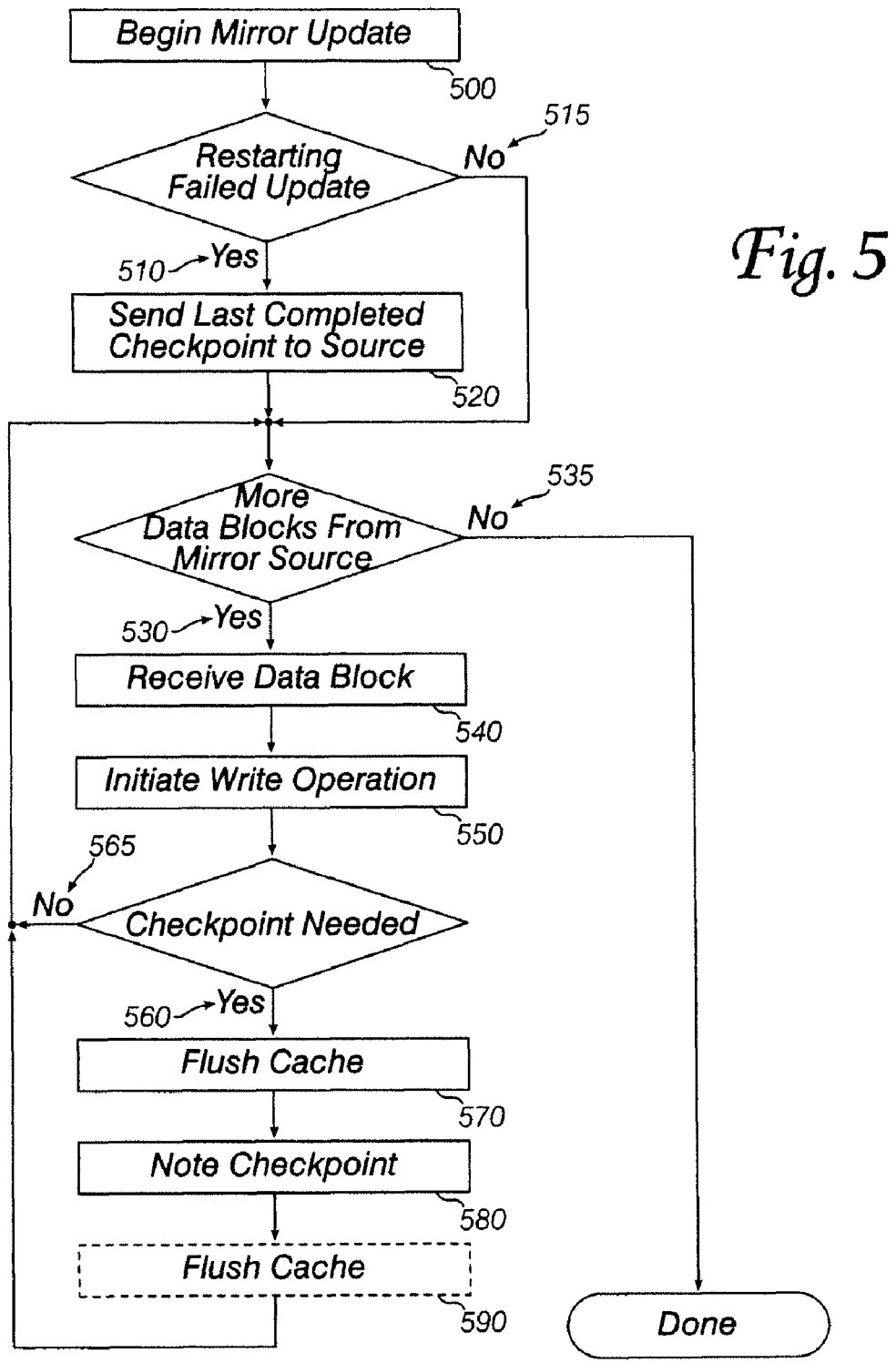
FIG. 5 outlines a mirror update process performed at a mirror destination storage server.

FIG. 5 shows how any individual mirror update can proceed, from the perspective of the mirror destination server. The mirror update begins (500), and the destination server checks to see whether this update previously failed. If so, (510) the destination server informs the source server of the last successfully-completed data block or checkpoint (520). The source server will skip over (not send) mirror update data blocks before the last block or checkpoint. Otherwise (515) the mirror update begins at the beginning.

While there are more modified data blocks from the mirror source (530), the blocks are received by the destination server (540) and submitted to the mirror destination storage server's write process (550). For example, as described in reference to FIG. 2, the data blocks may be placed in a cache and processed for eventual storage on a RAID group. Since the mirror destination volume is usually the same size as the mirror source volume (and, after the update process, will contain the same data), a large portion of the data processing described in reference to FIG. 2 can be skipped. That is, the mirror source logic can send an updated data block with the block's address, and the mirror destination file system need not perform any file-to-block translation. Instead, the mirror update block can be placed directly into the cache and scheduled for writing to mass storage.

If the mirror destination server decides that a checkpoint is needed (560), it causes a cache flush (570) and notes the corresponding checkpoint (580). Another cache flush may be performed (590) to ensure that the checkpoint is also committed to disk, before the method loops back to process more modified data blocks (if any) from the mirror source server.

The decision whether to perform a checkpoint is based on an engineering tradeoff: frequent checkpoints reduce the amount of work that must be repeated if the update fails, but require more frequent cache flush operations, which can adversely impact server performance. In general, it is preferable for checkpoint frequency to be set in inverse proportion to the reliability of the mirror update pathway; namely, if the mirror source, mirror destination or communication channel frequently encounter difficulties, then checkpoints should be performed more often.

The method outlined in FIG. 5 works well for a single mirror source and mirror destination, but consider the situation where the mirror destination maintains mirror storage volumes for a large number of different sources. Then, each update process (i.e., each independent instance of the method of FIG. 5) will perform cache flush operations (570 and possibly 590) at an appropriate frequency for the source/destination/channel combination. This will result in very frequent cache flushes, with unfavorable performance effects on every update (as well as on any other work the mirror destination server may be doing).

Figure 6A:
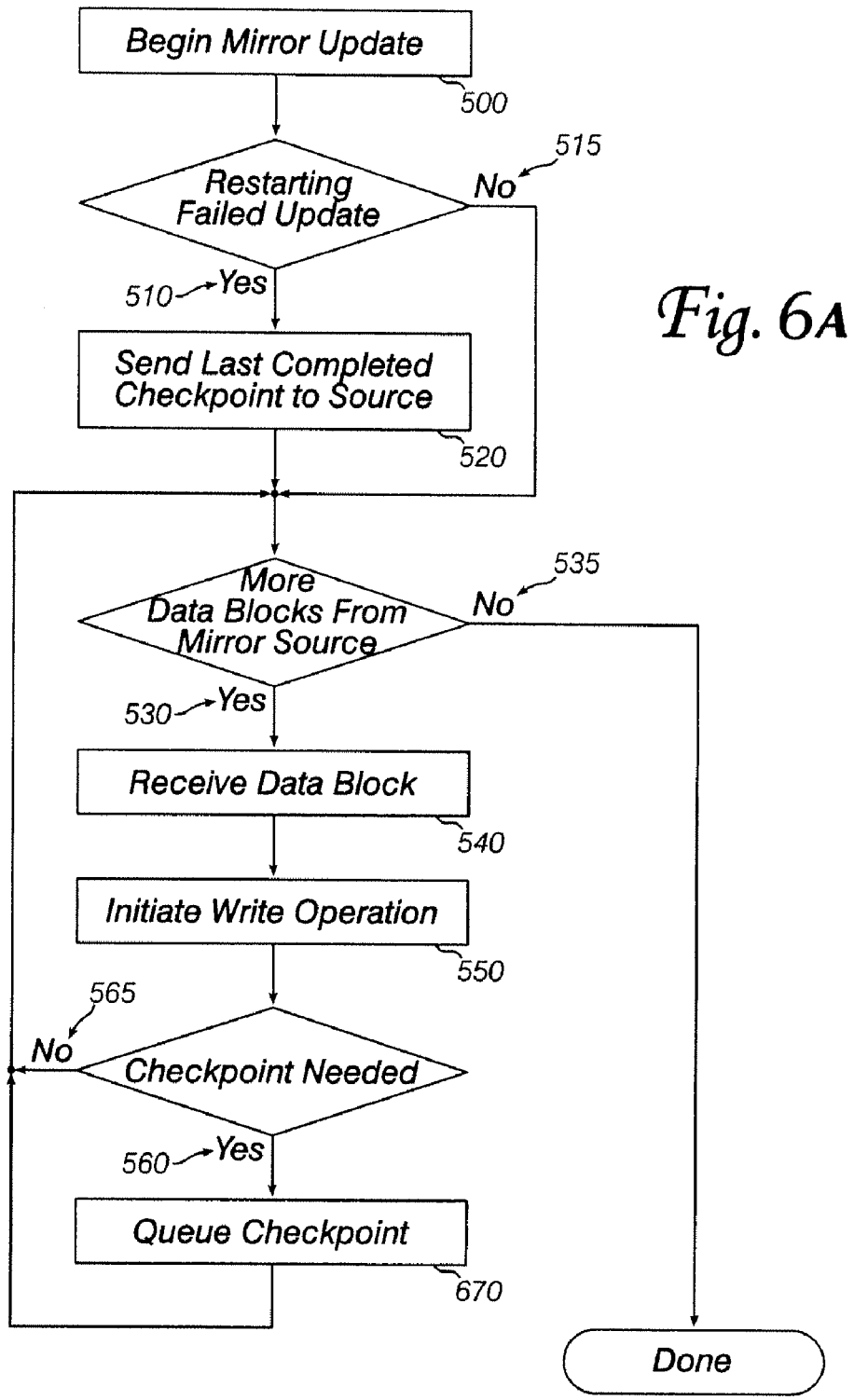
FIG. 6A shows how the mirror update process is modified to improve performance.

To alleviate this problem, an embodiment of the invention operates as described in FIG. 6A. The process is largely identical to the process of FIG. 5, but after it is determined that a checkpoint is needed (560), a checkpoint request is queued (670) and processing resumes without an explicit cache flush. A single thread or process (the "checkpoint thread") at the mirror destination storage server performs the method of FIG. 6B; specifically, after sleeping or delaying for an appropriate period (610), a check is made for any checkpoints queued by an active mirror update process during that period. If any checkpoints were queued (620), then the cache is flushed (630), and the queued checkpoints are noted (640). Another cache flush may be performed (650) to ensure that the noted checkpoints are also safely recorded to disk.

Since there is only one thread performing cache flushes for all mirror update processes, the frequency of the flushes is easily controlled to avoid overburdening the mirror destination storage server. For example, the sleep period can be set to a fixed length of time (e.g., five minutes), to a predetermined number of checkpoints queued, or to a predetermined amount of data buffered for writing. The logic of the checkpointing process can also be inverted; specifically, if the mirror destination storage server flushes its cache for any reason (e.g., the cache has reached a predetermined level of utilization, or a predetermined period of time has elapsed since a previous flush), then any checkpoints queued at the time can be noted since the corresponding mirror update blocks have been committed to disk.

The checkpoint thread "insulates" the mirror update threads from cache flushing activity. Cache flushes occur asynchronously with respect to the mirror update threads' posting of block writes and the queuing of checkpoints. That is, after an update thread queues a checkpoint (FIG. 6A, operation 670), the cache flush that commits the corresponding mirror update blocks to the mass storage devices may occur almost immediately, or may be delayed for a substantial period of time—all according to the operations of the independent checkpoint thread. Of course, some embodiments may arrange for the checkpoint thread to awaken and cause a cache flush when a predetermined number of checkpoints are queued. In such an embodiment, the cache flush occurs shortly after one of the update threads queues the checkpoint that takes the number of pending checkpoints over the threshold. However, with respect to the other update threads that have queued checkpoints, the cache flush is asynchronous.

Figure 6B:
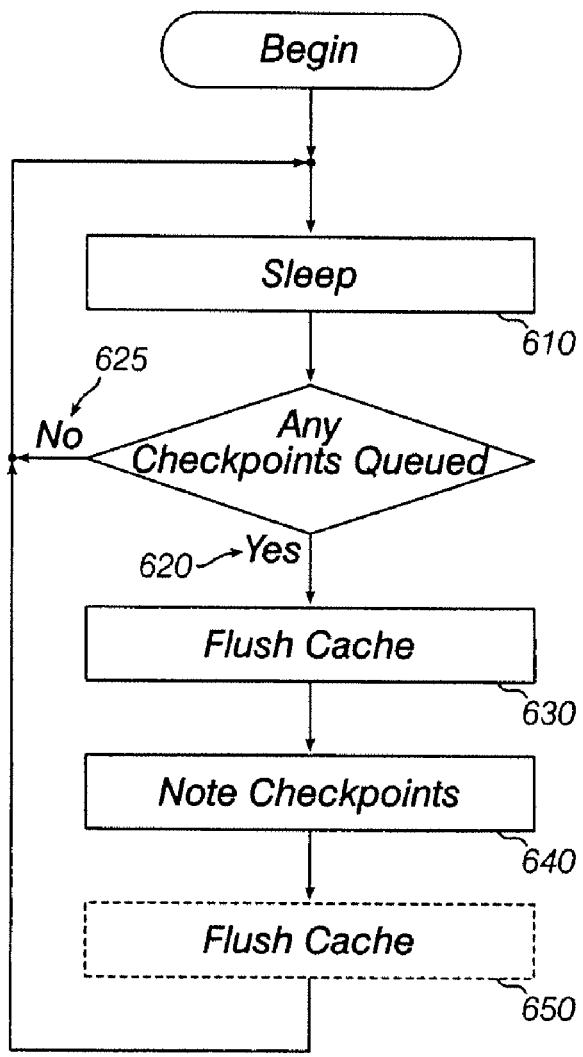
FIG. 6B is a flow chart outlining the activities of a checkpoint process that insulates mirror update processes from cache flushing activity.

According to the method outlined in FIGS. 6A and 6B, a mirror update thread may reach a checkpoint, queue it, and process additional mirror update packets before the mirror destination server eventually performs a cache flush. At this time, all update packets up to the checkpoint, plus a few additional update packets after it, are committed to disk. If the update process is then interrupted, it is restarted at the checkpoint, so those few additional update packets are retransmitted and resaved. As explained above, however, this causes no problems in the mirror destination volume because the update process is idempotent, and only wastes a small amount of time and resources in retransmitting the repeated packets. Furthermore, this waste only occurs if a mirror update fails, whereas the consolidation of checkpoints into a single thread gives improved performance for every concurrent mirror update process, every time.

Following the methods outlined above changes the meaning of a checkpoint slightly, from "this update process has committed data packets up to X" (where 'X' is an identifier of one of the modified data packets sent by the mirror source server), to "this update process has committed data packets up to X and possibly some additional data packets." The "additional data packets" are the ones that will be repeated if the update transaction is restarted after failure. This semantic change is backwards-compatible; namely, a prior-art mirror source server can interact with a mirror destination server that implements an embodiment of the invention.

Figure 7:
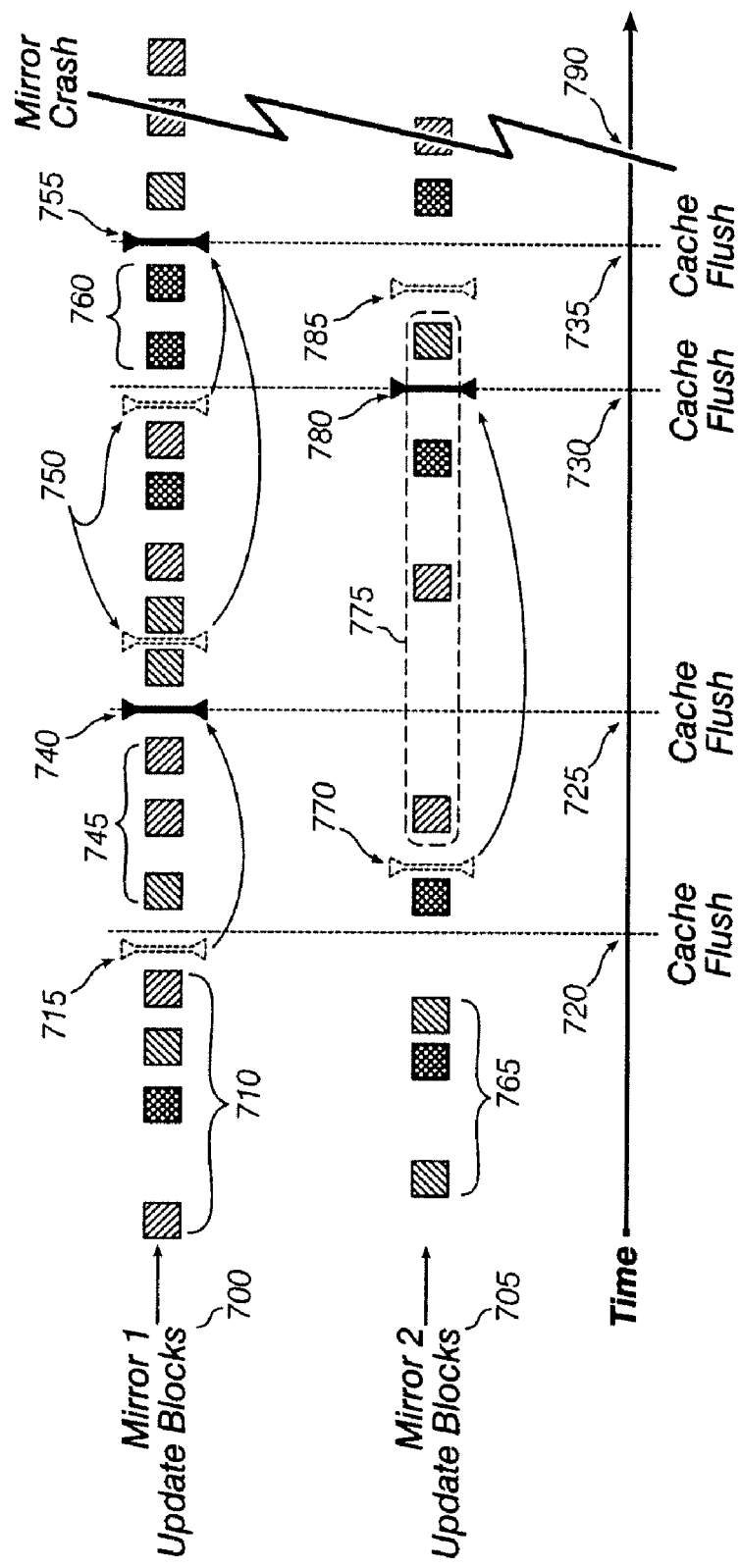
FIG. 7 shows how example series of mirror update data packets may be received and processed by a mirror destination storage server.

FIG. 7 is a timeline showing two sample series of mirror update packets 700, 705 from two mirror source storage servers and how they may be processed and recorded at the mirror destination storage server. The mirror destination logic in this example queues a checkpoint for a data stream after every four update packets are received and delivered to the storage subsystem. For example, after the four update packets indicated at 710 are received from the first mirror source, checkpoint 715 is queued.

Cache flushes performed by the mirror destination server are indicated at times 720, 725, 730 and 735. Any mirror update blocks received and delivered to the storage subsystem before (i.e., to the left of) a cache flush are committed disk during that flush. The cache flushes may be triggered by a number of different events or conditions, as discussed above. To reiterate, a flush may occur because a predetermined period of time has elapsed since a previous flush (e.g., a server may perform a cache flush at least every ten seconds). A flush may also be triggered by the accumulation of a threshold amount of "dirty" data in the cache (e.g., if the cache fills to 75% of its capacity, a flush is performed so that the dirty blocks can be marked "clean" and, if necessary, discarded from cache). A flush can also be triggered by any process in the storage server that needs to ensure that cached data is committed to disk. One such process is the checkpoint thread of an embodiment of the invention; namely, it may force a cache flush if it detects queued checkpoints at a periodic check (occurring, for example, every five minutes). The checkpoint thread may also (or instead) monitor the number of queued checkpoints and force a cache flush if the number exceeds a predetermined threshold. In one embodiment, predetermined thresholds for the number of queued checkpoints, a sleep period amount of time (e.g., a timer event), or the like for triggering the checkpoint thread to force a cache flush (consistency point) is determined by a system administrator.

At cache flush 720, the first four packets 710 of the mirror-1 update stream 700 are committed to disk, and the queued checkpoint 715 is made eligible for recording. However, it is not until the second cache flush at 725 that queued checkpoint 715 is written to disk (see black-filled checkpoint mark 740). At the same time, three additional packets 745 of the second slice are also stored.

Between the second cache flush at 725 and the third cache flush at 730, many update data packets of the first update stream 700 are received, and two checkpoints 750 are queued. Both checkpoints are recognized at cache flush 730 and are written to disk in cache flush 735 (see 755), along with packets 760 of the fourth slice.

Turning to the second stream of mirror update data blocks 705, note that the data blocks are not received synchronously with the blocks of the first stream 700. Part of the first slice 765 is committed during cache flush 720, and the first checkpoint 770 of the second stream is queued at 770. The complete first slice (and one packet from the second slice, 775) are committed at cache flush 725, and the first checkpoint is recorded at cache flush 730 (see 780). The entire second slice 775 is received and delivered to the storage subsystem, and the corresponding checkpoint 785 is queued. The second slice packets are committed at 735, but the mirror destination server crashes at 790. When these mirror updates are restarted, the first stream will restart with blocks 760 (which have already been committed to disk in cache flush 735), and the second stream will restart with the second slice 775, even though all of the data blocks have been committed to disk, because queued checkpoint 785 was not recorded before the mirror crash at 790.

Although the update packet streams 700, 705 are shown as distinct shaded boxes, in many embodiments the streams will be undelimited sequences of bytes, which can be logically divided into packets by intrinsic or extrinsic markers. A simple example of such logical division is the convention that the first 512 bytes make up the first update packet; the second 512 bytes make up the second update packet, and so on. A practical system may need to communicate additional information from the mirror source to the mirror destination, so the update data stream may have additional structure imposed upon it. For example, a packet header may provide the destination block number, length and a checksum for verifying data integrity, followed by the number of data bytes given as the length. The network connection carrying the update packet stream may be a Transmission Control Protocol ("TCP") connection. As mentioned earlier, the update packet stream may be encrypted to thwart eavesdroppers or attackers who wish to corrupt the mirror destination volume by injecting bogus mirror update data.

FIG. 8 shows some elements of a computer system that can function as a storage server implementing an embodiment of the invention. A storage server has at least one programmable processor ("central processing unit" or "CPU"); the system shown in FIG. 8 has two CPUs 810. The programmable processor(s) execute instructions contained in memory 820 to implement methods according to an embodiment of the invention. Various modules containing data and instructions may be found in memory 820. For example, operating system ("OS") 823 may implement the functions described in reference to FIG. 2. Mirror destination logic 825 is shown separately in this Figure, but in practice may be combined with or embedded in operating system 823. Block cache 828 contains data blocks that have been read from, or are scheduled to be written to, mass storage devices 875.

A persistent memory 830, which may be a non-volatile random access memory ("NVRAM") such as a battery-backed RAM, stores protected data 835 so that it will not be lost if there is a system anomaly or crash. Network interface 840 permits the system to communicate and exchange data with clients and mirror source server peers over a distributed data network 130 (can be, for example, an Ethernet adapter, Fibre Channel adapter, or the like). Mass storage device interface 860 permits the system to read and write data stored on, for example, RAID array 875 (can be, for example, a Fibre Channel adapter, SATA adapter, or the like). These components are connected to, and exchange data and control signals via, system bus 890.

An embodiment of the invention may be a machine-readable medium having stored thereon data and instructions ("software") to cause a programmable processor to perform operations as described above. In other embodiments, the operations might be performed by specific hardware components that contain hardwired logic. Those operations might alternatively be performed by any combination of programmed computer components and custom hardware components. The term "logic", therefore, as used herein, can include hardware circuitry (which can be programmable or non-programmable), software, firmware, or any combination thereof.

In some embodiments, the instructions for a programmable processor may be treated as data and used to modulate a carrier signal, which then encodes data representing the instructions for a programmable processor. The modulated, data-bearing signal is transmitted over a distributed data network such as the Internet, where it is received by a destination computer. The signal is demodulated to recover the data representing instructions for a programmable processor, and those instructions are saved on one or more machine-readable media at the destination computer. Finally, a programmable processor at the destination executes the saved instructions to cause the destination to perform operations according to an embodiment of the invention. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage medium at the receiver to create another embodiment of the invention, meeting the description of a machine-readable medium storing data and instructions to perform some of the operations discussed above. Executing such an embodiment at the receiver may result in the receiver performing operations according to a third embodiment.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a source code package that does not contain an embodiment.

In the foregoing description, numerous details were set forth. It will be apparent, however, to one skilled in the art, that the present invention may be practiced without these specific details. In some instances, well-known structures and devices were shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "sending," "receiving," "attaching," "forwarding," "caching," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention was not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic device) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.)

The applications of the present invention have been described largely by reference to specific examples and in terms of particular allocations of functionality to certain hardware and/or software components. However, those of skill in the art will recognize that the storage server mirror operations can be improved by software and hardware that distribute the functions of embodiments of this invention differently than herein described. Such variations and implementations are understood to be captured according to the following claims.

We claim:

1. A method comprising:
receiving a plurality of data streams from a plurality of mirror source storage servers to maintain a corresponding plurality of mirror images of storage server volumes at a mirror destination storage server;
caching units of each data stream from the plurality of mirror source storage servers in a temporary memory of the mirror destination storage server;
queuing a checkpoint to the temporary memory at a point in time, the checkpoint associated with the units cached prior to the point in time; and
flushing the temporary memory to persistent storage of the mirror destination storage server according to a schedule that is asynchronous with respect to the units of at least one of the plurality of data streams, wherein flushing the temporary memory writes the units associated with the checkpoint to the persistent storage and records the checkpoint on the persistent storage.

2. The method of claim 1 wherein the flushing operation is asynchronous with respect to the packets of all of the plurality of data streams.

3. The method of claim 1 wherein the flushing operation is triggered solely by a time-based trigger.

4. The method of claim 1 wherein the flushing operation is by an elapsed time since an immediately-prior cache flush reaching a time threshold.

5. The method of claim 1 wherein the flushing operation is triggered by an arrival of a packet from one of the plurality of data streams.

6. The method of claim 1, further comprising:
restarting one of the plurality of data streams after an interruption;
finding a last data packet of the one of the plurality of data streams that was flushed before the interruption; and
sending an identifier of the last data packet to a mirror source server to cause the mirror source server to skip data packets appearing before the last data packet in the restarted one of the plurality of data streams.

7. A computer-readable medium storing data and instructions to cause a programmable processor to perform operations comprising:
launching a plurality of mirror update processes to maintain mirror images of a corresponding plurality of source volumes, each process of the plurality of mirror update processes to execute a method including:
receiving a plurality of mirror update packets;
delivering the plurality of mirror update packets to a cache memory in a mirror server; and
queuing a checkpoint in the cache memory at a point in time after delivering the plurality of mirror update packets to the cache memory, the checkpoint associated with the mirror update packets delivered prior to the point in time; and, in an asynchronous checkpoint process:
waiting until a periodic timer event;
determining whether any checkpoints have been queued by the plurality of mirror update processes; and
if any checkpoints have been queued, flushing the cache memory to write the mirror update packets associated with a queued checkpoint to a persistent storage on the mirror server and to record the queued checkpoints on the persistent storage.

8. The computer-readable medium of claim 7, containing additional data and instructions to cause the programmable processor to perform operations comprising:
in each of the plurality of mirror update processes, checking for a failed mirror update;
finding a last-completed checkpoint of the failed mirror update; and
transmitting the last-completed checkpoint to a mirror source server that maintains the corresponding source volume.

9. The computer-readable medium of claim 7 wherein receiving the plurality of mirror update packets comprises receiving a Transmission Control Protocol ("TCP") stream and analyzing a logical structure of the TCP stream to identify the plurality of mirror update packets.

10. The computer-readable medium of claim 7 wherein each of the mirror update processes is to queue a checkpoint after receiving and delivering a predetermined number of mirror update packets to the cache memory or after a predetermined duration of time has elapsed since the last checkpoint was queued.

11. The computer-readable medium of claim 7 wherein each of the mirror update processes is to queue a checkpoint after receiving and delivering mirror update packets of a Redundant Array of Independent Disks ("RAID array") stripe to the cache memory.

12. The computer-readable medium of claim 7 wherein the asynchronous checkpoint process is to flush the cache memory periodically if at least one checkpoint has been queued.

13. The computer-readable medium of claim 7 wherein the asynchronous checkpoint process is to flush the cache memory after a predetermined number of checkpoints have been queued.

14. The computer-readable medium of claim 7 wherein the asynchronous checkpoint process is to record queued checkpoints after a successful cache flush.

15. The computer-readable medium of claim 14 wherein the asynchronous checkpoint process is to flush the cache memory after recording at least one queued checkpoint.

16. A system comprising:
a first storage server to store a first data volume;
a second storage server to store a second data volume; and
a mirror server to maintain mirror images of the first data volume and the second data volume, said mirror server including a cache memory to hold data temporarily before writing the data to a mass storage device, the mirror server comprising:
second logic to execute a first process at the mirror server to receive first mirror update data from the first storage server, deliver the mirror update data to the cache memory, and queue a first checkpoint in the cache memory at a first point in time, the first checkpoint associated with the mirror update data delivered prior to the first point in time;

third logic to execute a second process at the mirror server to receive second mirror update data from the second storage server, deliver the second mirror update data to the cache memory, and queue a second checkpoint in the cache memory at a second point in time, the second checkpoint associated with the second mirror update data delivered prior to the second point in time; and first logic to execute a third process at the mirror server to flush the cache memory to write the mirror update data associated with the first and second checkpoints to the mass storage device and to record the first and second checkpoints to the mass storage device.

17. The system of claim 16 wherein the first logic is further to queue a checkpoint after receiving and delivering a predetermined number of mirror update packets to the cache memory or after a predetermined duration of time has elapsed since the last checkpoint was queued.

18. The system of claim 16, wherein the flushing operation is triggered solely by a time-based trigger.

19. The system of claim 16, wherein the flushing operation is asynchronous with respect to the packets of all of the plurality of data streams.

20. The system of claim 16, wherein the flushing operation is by an elapsed time since an immediately-prior cache flush reaching a time threshold.

21. A method comprising:
receiving a plurality of data streams from a plurality of mirror source storage servers to maintain a corresponding plurality of mirror images of storage server volumes at a mirror destination storage server;

caching units of each data stream from the plurality of mirror source storage servers in a temporary memory of the mirror destination storage server; and avoiding frequent flushing of the temporary memory to persistent storage of the mirror destination storage server by queuing a checkpoint to the temporary memory at a point in time, the checkpoint associated with units cached prior to the point in time, and flushing the temporary memory to write the units and the checkpoint to the persistent storage.

22. The method of claim 21, further comprising:
flushing the temporary memory to persistent storage of the mirror destination storage server according to a schedule that is asynchronous with respect to the units of at least one of the plurality of data streams.

23. The method of claim 21, further comprising:
determining a number of queued checkpoints; and
triggering a checkpoint thread of the mirror destination storage server to force a flush of the temporary memory to persistent storage of the mirror destination storage server if the number of queued checkpoints exceeds a predetermined threshold.

24. The method of claim 21, further comprising:
detecting a timer event; and
forcing a flush of the temporary memory to persistent storage of the mirror destination storage server if a queued checkpoint is detected.

* * * * *